(12) United States Patent
Goriesky et al.

(10) Patent No.: US 11,085,213 B2
(45) Date of Patent: Aug. 10, 2021

(54) SYSTEMS AND METHODS FOR ADAPTING ACTIVATION TIMING OF ALERTS

(71) Applicant: DENSO CORPORATION, Kariya (JP)

(72) Inventors: Joshua Goriesky, Plymouth, MI (US);
Nathaniel Sherrit, Southfield, MI (US);
Ryo Takaki, Southfield, MI (US)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/715,703

(22) Filed: Dec. 16, 2019

(65) Prior Publication Data

US 2021/0180373 A1    Jun. 17, 2021

(51) Int. Cl.
| | | |
|---|---|---|
| *B60Q 9/00* | (2006.01) | |
| *E05C 17/00* | (2006.01) | |
| *E05B 77/14* | (2014.01) | |
| *B60Q 5/00* | (2006.01) | |
| *B60R 21/015* | (2006.01) | |
| *B60Q 1/52* | (2006.01) | |
| *B60R 21/01* | (2006.01) | |

(52) U.S. Cl.
CPC ............ *E05C 17/006* (2013.01); *B60Q 1/525* (2013.01); *B60Q 5/006* (2013.01); *B60Q 9/008* (2013.01); *B60R 21/015* (2013.01); *E05B 77/14* (2013.01); *B60R 2021/01013* (2013.01)

(58) Field of Classification Search
CPC ...................................................... B60Q 9/008
See application file for complete search history.

(56) References Cited

U.S. PATENT DOCUMENTS

| | | | |
|---|---|---|---|
| 7,586,402 B2 | 9/2009 | Bihler et al. | |
| 8,963,701 B2* | 2/2015 | Rodriguez Barros | ................ B60Q 1/2665 340/438 |
| 10,000,172 B2 | 6/2018 | Gurghian et al. | |
| 10,086,833 B1 | 10/2018 | Duan et al. | |
| 10,435,920 B2 | 10/2019 | Ganeshan et al. | |
| 10,657,818 B2* | 5/2020 | Dhull | ............ G09F 19/18 |
| 2007/0057780 A1 | 3/2007 | Bridges et al. | |
| 2009/0033477 A1 | 2/2009 | Illium et al. | |
| 2012/0065858 A1* | 3/2012 | Nickolaou | ............ B60Q 9/008 701/70 |
| 2012/0194356 A1* | 8/2012 | Haines | ................ B60Q 1/323 340/933 |
| 2013/0234844 A1 | 9/2013 | Yopp | |
| 2014/0118130 A1* | 5/2014 | Chang | ................ B60Q 5/006 340/435 |

(Continued)

*Primary Examiner* — K. Wong
(74) *Attorney, Agent, or Firm* — Christopher G. Darrow; Darrow Mustafa PC (57) ABSTRACT

System, methods, and other embodiments described herein relate to alerting a passenger about hazards when exiting a subject vehicle. In one embodiment, a method includes identifying an initial target and a subsequent target according to sensor data about a surrounding environment of the subject vehicle. The method includes, in response to determining that the initial target satisfies an alert threshold, activating an initial alert for a defined time to inform the passenger of a hazard associated with the initial target and the passenger exiting the subject vehicle into a path of the initial target. The method includes extending the defined time responsive to the subsequent target satisfying the alert threshold and a timing threshold that defines a cool-down period between activating separate alerts.

20 Claims, 5 Drawing Sheets

(56) References Cited

U.S. PATENT DOCUMENTS

2014/0297173 A1* 10/2014 Li .................... G08G 1/166
　　　　　　　　　　　　　　　　　　　701/301
2017/0309181 A1* 10/2017 Lee .................. G01S 13/867
2019/0211587 A1　　7/2019 Ganeshan et al.

\* cited by examiner

SYSTEMS AND METHODS FOR ADAPTING ACTIVATION TIMING OF ALERTS

TECHNICAL FIELD

The subject matter described herein relates in general to systems and methods for providing warnings to occupants of a vehicle and, more particularly, to extending an alert from a first event when multiple events are detected in succession thereby avoiding an intermittent lapse of the alert during which the occupant may encounter a hazard if exiting the vehicle.

BACKGROUND

Vehicles may employ various safety systems to protect passengers, such as airbags, active/passive restraints, automated control assistance (e.g., anti-lock braking systems (ABS)), and so on. While these systems improve the safety of the passengers, they do not generally function to improve the safety of the passengers from external hazards when exiting the vehicle. That is, the noted systems facilitate preventing crashes and/or protecting passengers against injury while underway in the vehicle, but do not generally facilitate helping the passenger when, for example, exiting the vehicle.

Thus, the passenger is generally left to their own intuition when exiting from the vehicle in relation to potential hazards that exist around the vehicle. Moreover, while some systems may provide warnings to passengers about nearby vehicles, such systems generally lack the ability to distinguish between particular hazards of various scenarios. For example, various systems may directly issue alerts whenever a nearby vehicle is sensed but fails to account for different occurrences of multiple vehicles in succession. As such, there is generally a need to better inform the passenger in order to further ensure the safety of the passenger when exiting the vehicle.

SUMMARY

In one embodiment, example systems and methods associated with alerting a passenger about hazards when exiting a subject vehicle are disclosed. As previously noted, external hazards such as closely passing vehicles may be difficult for a passenger to identify when exiting a vehicle. Even more problematic can be a circumstance in which a safe exit system provides abruptly ends an alert as a hazard passes only to soon thereafter initiate another alert for a subsequent hazard. This short intervening time without an alert can provide a false sense of safety to a passenger resulting in the passenger exiting the vehicle only to encounter an additional hazard subsequent to the first hazard.

Therefore, in one embodiment, a disclosed system improves the safety of a passenger by extending an initial alert about a first hazard when a subsequent hazard proceeds after the first to avoid intervals without an alert when hazards occur in close succession. For example, in one embodiment, the disclosed system initially identifies the presence of multiple targets in a surrounding environment of a subject vehicle. The targets may include any type of dynamic object that represents a hazard to a passenger exiting the vehicle. Thus, the targets may be other vehicles, motorcyclists, bicyclists, pedestrians (e.g., runners), etc. From observed information about the targets such as positions and velocities, the disclosed system may determine trajectories for the targets and whether the targets represent hazards to a passenger exiting the vehicle.

Accordingly, the disclosed system may initially activate an alert about a first one of the targets when the target is a hazard. If an additional target is then identified as a threat for which an alert will be provided, the initial alert, in one embodiment, is extended to remain active through an intervening time between the alerts. Thus, instead of deactivating the alert for a short period of time and potentially providing a false sense of safety to the passenger, the system can extend the alert to effectively merge the initial alert and a subsequent alert, thereby improving situational awareness of the passenger. In this way, the disclosed approach functions to improve the safety of the passenger by extending alerts when successive hazards are present to improve awareness of the passenger when exiting the vehicle.

In one embodiment, a warning system for alerting a passenger about hazards when exiting a subject vehicle is disclosed. The warning system includes one or more processors and a memory that is communicably coupled to the one or more processors. The memory stores a detection module including instructions that when executed by the one or more processors cause the one or more processors to identify an initial target and a subsequent target according to sensor data about a surrounding environment of the subject vehicle. The memory stores an alert module including instructions that when executed by the one or more processors cause the one or more processors to, in response to determining that the initial target satisfies an alert threshold, activate an initial alert for a defined time to inform the passenger of a hazard associated with the initial target and the passenger exiting the subject vehicle into a path of the initial target. The alert module includes instructions to extend the defined time responsive to the subsequent target satisfying the alert threshold and a timing threshold that defines a cool-down period between activating separate alerts.

In one embodiment, a non-transitory computer-readable medium for alerting a passenger about hazards when exiting a subject vehicle is disclosed. The computer-readable medium stores instructions that, when executed by one or more processors, cause the one or more processors to perform the disclosed functions. The instructions include instructions to identify an initial target and a subsequent target according to sensor data about a surrounding environment of the subject vehicle. The instructions include instructions to, in response to determining that the initial target satisfies an alert threshold, activate an initial alert for a defined time to inform the passenger of a hazard associated with the initial target and the passenger exiting the subject vehicle into a path of the initial target. The instructions include instructions to extend the defined time responsive to the subsequent target satisfying the alert threshold and a timing threshold that defines a cool-down period between activating separate alerts.

In one embodiment, a method of alerting a passenger about hazards when exiting a subject vehicle is disclosed. In one embodiment, the method includes identifying an initial target and a subsequent target according to sensor data about a surrounding environment of the subject vehicle. The method includes, in response to determining that the initial target satisfies an alert threshold, activating an initial alert for a defined time to inform the passenger of a hazard associated with the initial target and the passenger exiting the subject vehicle into a path of the initial target. The method includes extending the defined time responsive to the subsequent target satisfying the alert threshold and a timing threshold that defines a cool-down period between activating separate alerts.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with alerting a passenger about hazards when exiting a subject vehicle are disclosed. As previously noted, passengers exiting a vehicle can be vulnerable to closely passing vehicles and other dynamic objects. For example, when a passenger exits a vehicle that is stopped along a roadway, in a parking lot, or in another location where dynamic objects may pass proximate to the vehicle, the passenger is at risk of colliding with the objects. In some circumstances, such a collision may have minimal impact (e.g., collision with another pedestrian), while in further circumstances such an encounter may have much greater consequences, but in no circumstances is such an encounter desirable.

Moreover, in various embodiments, a system may issue alerts according to the proximity of detected objects to the subject vehicle. However, such alerts generally fail to account for multiple successive hazards, and, thus, may end abruptly as a hazard passes only to soon thereafter re-initiate for another subsequent hazard. This short intervening time without an alert can provide a false sense of safety to a passenger resulting in the passenger exiting the vehicle only to encounter an additional hazard subsequent to the first hazard.

Therefore, in one embodiment, a disclosed system improves the safety of a passenger by extending an initial alert when a subsequent hazard exists after a first hazard to avoid short intervals without an alert when hazards occur in close succession. For example, in one embodiment, the disclosed system initially identifies the presence of multiple targets in a surrounding environment of a subject vehicle. The targets may include any type of dynamic object that represents a hazard to a passenger exiting the vehicle. Thus, the targets may be other vehicles, motorcyclists, bicyclists, pedestrians (e.g., runners), etc. From observed information about the targets such as positions and velocities, the disclosed system may determine predicted trajectories for the targets and whether the targets represent hazards to a passenger exiting the vehicle. In one example, the system determines whether the identified targets are within or will pass within a defined threshold distance of the vehicle according to the observed information.

Accordingly, the disclosed system may initially activate an alert about a first one of the targets when the target is a hazard. The alert itself may take different forms that can include locking the vehicle door, visual indicators about the hazard, audible indicators, haptic feedback, and so on. Subsequently, if the system identifies an additional target as a threat for which an alert will be provided, the initial alert, in one embodiment, is extended to remain active through an intervening time between the alerts. Thus, instead of deactivating the alert for a short period of the intervening time and potentially providing a false sense of safety to the passenger, the system can extend the alert to effectively merge the initial alert and a subsequent alert, thereby improving situational awareness of the passenger that the safety threat remains active should they choose to exit the vehicle. In this way, the disclosed approach functions to improve the safety of the passenger by extending alerts when successive hazards are present to improve awareness of the passenger when exiting the vehicle.

Figure 1:
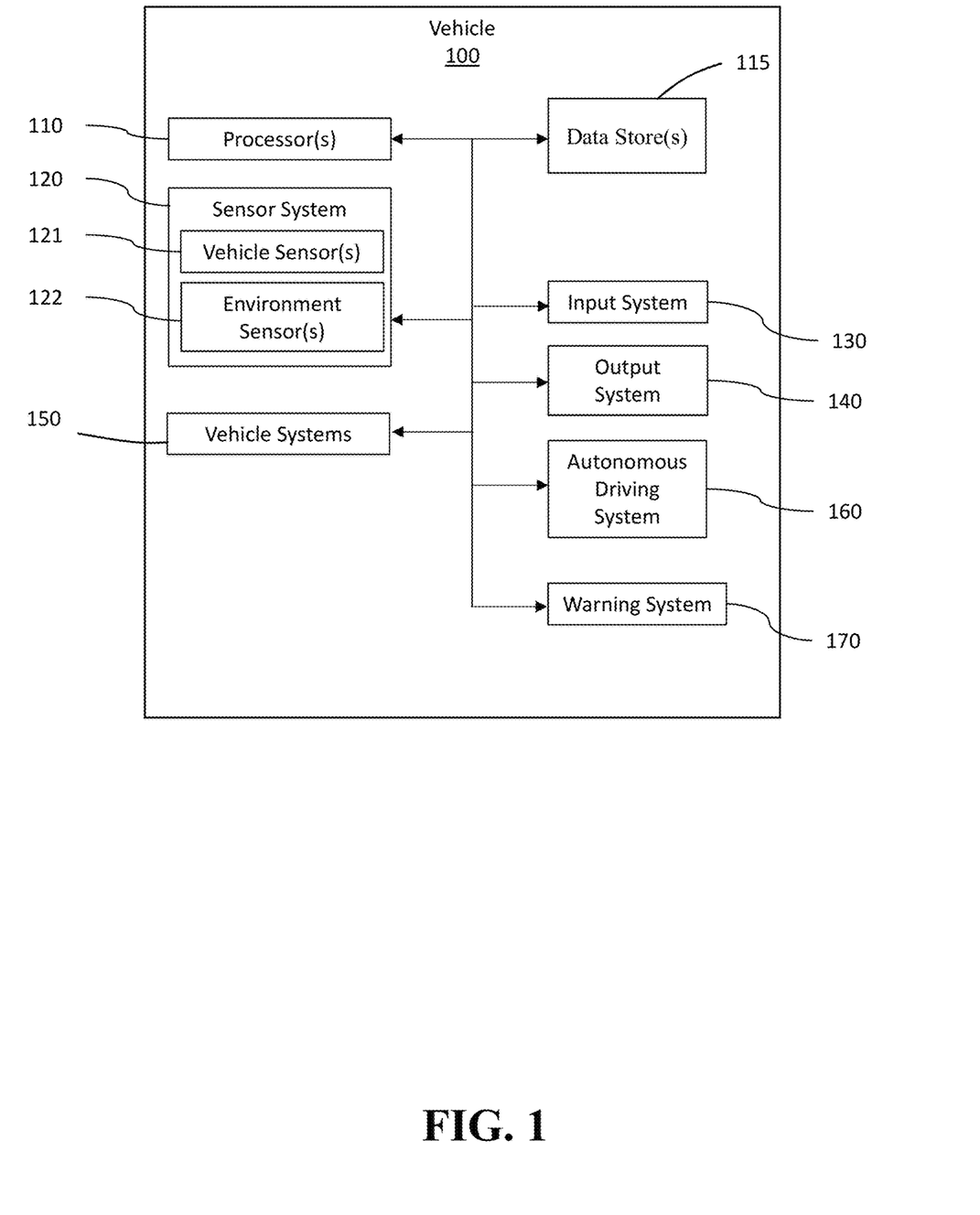
FIG. 1 illustrates one embodiment of a configuration for a vehicle in which example systems and methods disclosed herein may operate.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport that, for example, transports passengers, and thus benefits the functionality discussed herein.

The vehicle 100 also includes various elements. It will be understood that in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 (also referred to as the subject vehicle or ego vehicle herein) includes a warning system 170 that functions to improve the safety of passengers of the vehicle 100. Moreover, while depicted as a standalone component, in one or more embodiments, the warning system 170 is integrated with the autonomous driving system 160 (e.g., when present), or another component of the vehicle 100. The noted functions and methods will become more apparent with a further discussion of the figures.

Figure 2:
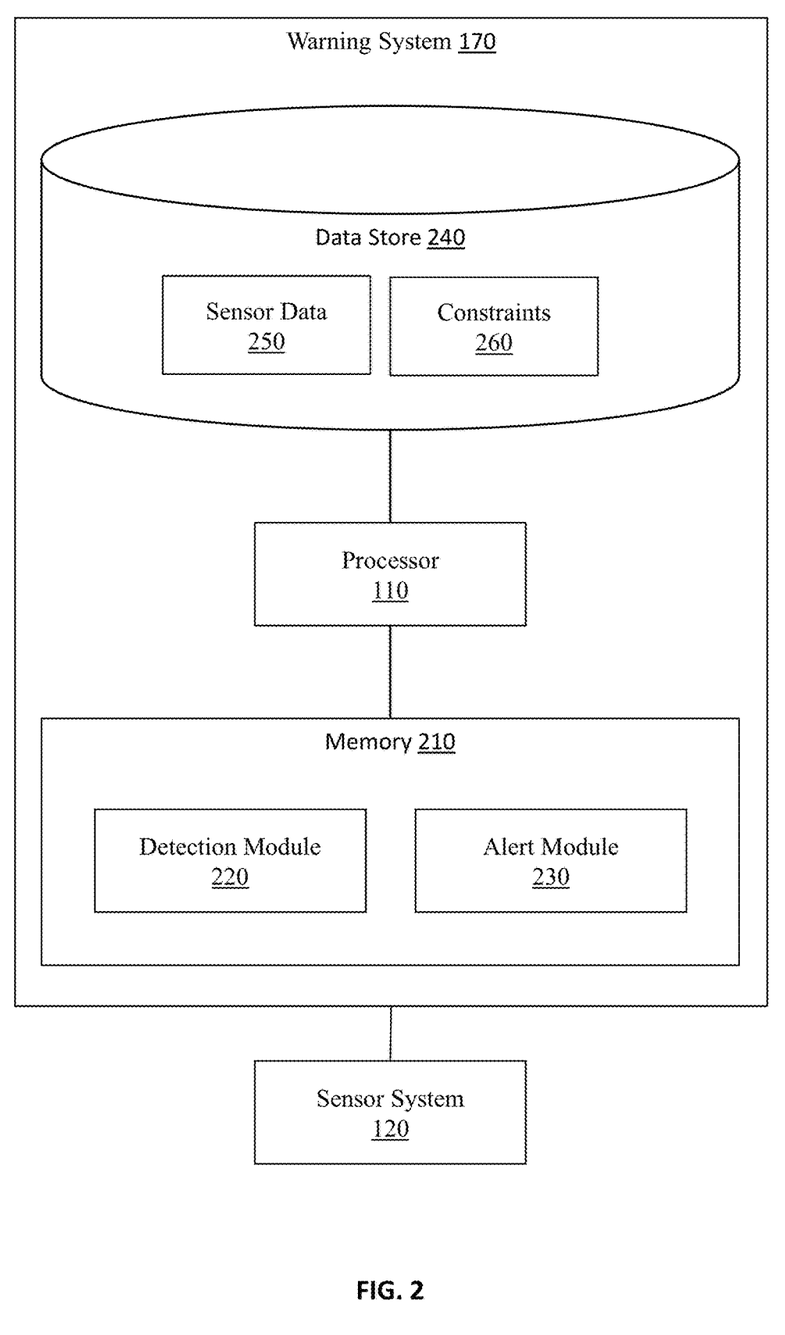
FIG. 2 illustrates one embodiment of a warning system that is associated with alerting a passenger about hazards when exiting a subject vehicle.

With reference to FIG. 2, one embodiment of the warning system 170 is further illustrated. As shown, the warning system 170 includes a processor 110. Accordingly, the processor 110 may be a part of the warning system 170, or the warning system 170 may access the processor 110 through a data bus or another communication pathway. In one or more embodiments, the processor 110 is an application-specific integrated circuit that is configured to implement functions associated with a detection module 220 and an alert module 230. More generally, in one or more aspects, the processor 110 is an electronic processor such as a microprocessor that is capable of performing various functions as described herein when loading the noted modules and executing encoded functions associated therewith.

In one embodiment, the warning system 170 includes a memory 210 that stores the detection module 220 and the alert module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware such as processing components (e.g., controllers), circuits, etc. for independently performing one or more of the noted functions.

Furthermore, in one embodiment, the warning system 170 includes a data store 240. The data store 240 is, in one embodiment, an electronically-based data structure for storing information. In at least one approach, the data store 240 is a database that is stored in the memory 210 or another suitable medium, and that is configured with routines that can be executed by the processor 110 for analyzing stored data, providing stored data, organizing stored data, and so on. In either case, in one embodiment, the data store 240 stores data used by the modules 220 and 230 in executing various functions. In one embodiment, the data store 240 includes sensor data 250, and constraints 260 (e.g., alert thresholds, timing thresholds, defined activation times, etc.) along with, for example, other information that is used by and/or produced by the modules 220 and 230.

Accordingly, the detection module 220 generally includes instructions that function to control the processor 110 to acquire data inputs from one or more sensors (e.g., the sensor system 120) of the vehicle 100 that form the sensor data 250. In general, the sensor data 250 includes information that embodies observations of the surrounding environment of the vehicle 100. The observations of the surrounding environment, in various embodiments, can include surrounding lanes, targets (e.g., dynamic objects), static objects, obstacles, etc. that may be present in the lanes, proximate to a roadway, within a parking lot, garage structure, driveway, or another area within which the vehicle 100 is traveling and/or parked.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more surrounding vehicles or from one or more infrastructure-based sensors (e.g., vehicle-to-infrastructure). Thus, the sensor data 250, in one embodiment, represents a combination of perceptions acquired from multiple sensors and/or sources.

In addition to locations of surrounding targets, the sensor data 250 may also include, for example, information about lane markings, velocities of surrounding targets, positions, and so on. Moreover, the detection module 220, in one embodiment, controls the sensors to acquire the sensor data 250 about an area that encompasses 360 degrees about the vehicle 100 in order to provide a comprehensive assessment of the surrounding environment. Accordingly, the sensor data 250 may include varying forms of observations about the surrounding environment that the detection module 220 derives from a single type of sensor (e.g., a radar sensor) or that the detection module 220 derives from fusing sensor data from multiple sources (e.g., mono-camera, stereo camera, LiDAR, radar, ultrasonic, etc.). In any case, the sensor data 250 provides observations of the surrounding environment to support the detection, identification, and localization of the targets, and, in at least one embodiment, aspects of the environment that may influence paths/trajectories of the targets.

Thus, the detection module 220 processes the sensor data 250 to detect the surrounding objects and track particular ones of the objects as targets (e.g., objects traveling in a lane adjacent to the vehicle 100). As previously noted, the surrounding objects can include various types of objects such as vehicular (e.g., automobiles, trucks, motorcycles, etc.), non-vehicular (e.g., pedestrians, animals, bicycles, etc.), etc. Whichever objects makeup the detected surrounding objects/targets, the warning system 170 generally functions to determine hazards to a passenger that may exit via one of the doors of the vehicle 100 and provide the alerts for the hazards.

Moreover, while the present disclosure generally describes the warning system 170 within the context of detecting two surrounding vehicles, and providing the alerts in relation to the two surrounding vehicles, it should be appreciated that the warning system 170 may detect and provide alerts for any number of vehicles and/or other objects in a surrounding environment. For example, in various examples, the warning system 170 may detect two, three, four, or more objects, including vehicles and other types of dynamic objects.

In any case, the detection module 220, as noted, generally functions to detect the target objects and determine the characteristics of the targets from the sensor data 250. The characteristics generally include at least a current position relative to the vehicle 100, and a velocity (i.e., speed and direction). In additional aspects, the detection module 220 may further predict trajectories that are, for example, extrapolated from multiple prior observations (e.g., over two or more prior time steps). In any case, the detection module 220 generally uses the position and velocity information about the targets to predict future positions of the targets from which the detection module 220 can generate a determination about whether the targets are hazards or not. Of course, in other approaches, the detection module 220 may simply determine whether the targets are hazards according to a current position relative to the vehicle 100.

In any case, the detection module 220 functions to detect and determine characteristics of the surrounding objects so that the alert module 230 can determine which of the objects represent hazards that are then identified as targets and are tracked accordingly. Thus, as noted, in various aspects, the detection module 220 may generate separate observations (e.g., positions and/or trajectories) about the targets that the detection module 220 provides to the alert module 230 for further analysis. For example, in an instance where the detection module 220 is tracking to successive targets, the detection module 220 may generate a first trajectory and a second trajectory associated with the respective targets and provide the trajectories to the alert module 230 at defined intervals. In this way, the warning system 170 can track targets and determine when to generate alerts.

With continued reference to FIG. 2, in one embodiment, the alert module 230 generally includes instructions that function to control the processor 110 to determine when targets constitute hazards and to activate alerts accordingly. In a further aspect, the alert module 230 extends or otherwise merges alerts for successive hazards in order to avoid brief periods without an active alert between successive hazards. By way of example, consider an occurrence of the detection module 220 detecting two vehicles approaching the vehicle 100 in succession. The alert module 230 uses the observations derived by the detection module 220 about the first and second vehicle (i.e., first and second targets) to determine whether the vehicles are hazards to a passenger that may exit the vehicle 100. In one embodiment, the alert module 230 iteratively compares the position of identified dynamic objects to an alert threshold to determine whether a respective object is a hazard. In one embodiment, the constraints 260 define the alert threshold as a minimum clearance (e.g., 2.0 m) between the vehicle 100 and a passing object. In further aspects, the alert module 230 extrapolates a path of the target out to a defined horizon (e.g., the defined time) and uses an estimated position of the target to determine whether the alert threshold is satisfied.

Thus, the alert module 230, in one embodiment, determines a lateral offset of an object with respect to a subject door of the vehicle 100. That is, as a further aspect, in one approach, the alert module 230 monitors the doors of the vehicle 100 to determine which door is potentially associated with an exiting passenger and determines the lateral offset of the approaching object according to a corresponding side of the vehicle 100 for the door. In one aspect, the sensor data 250 can further include information about an interior of the vehicle 100, such as, seat occupancy sensors, door sensors, seat belt sensors, characteristics of the passenger (e.g., mobility, age, etc.), and other information that provides insights about the passenger and which door the passenger is likely to exit.

Thus, in one embodiment, when the system 170 detects that the vehicle 100 stops, and that a seat belt is unbuckled and/or a door handle is activated, the alert module 230 then generates an alert for a corresponding side/door of the vehicle 100, if conditions for providing an alert are met (e.g., a target object is within the alert threshold or will pass within the alert threshold in a defined period of time ~5.0 s). In a further aspect, the alert module 230 may provide an alert whenever a hazard is present, and the vehicle 100 is stopped without consideration to aspects relating specifically to the passenger (e.g., seat belt sensor, etc.). It should be appreciated that such an alert is generally not delivered when the vehicle 100 is in motion.

Additionally, the alert module 230, in one or more aspects, uses the characteristics of the passenger to adjust (e.g., lengthen) the defined time for which the alert is delivered prior to the target passing within the alert threshold. For example, in one approach, the alert module 230 detects the characteristics of the passenger using interior sensors of the vehicle 100, such as cameras. In further aspects, the passenger may provide direct inputs to the system 170 specifying aspects, such as mobility, age, etc. In general, mobility is intended to encompass the ability of the passenger to move into and out of the vehicle 100. Thus, the alert module 230 may define the mobility of the user according to age (e.g., youth vs. elderly), disability status (e.g., wheel chair, crutches, etc.), or other indicators that can be derived according to acquired sensor data or directly from the inputs. While the alert module 230 may use age as a direct indicator of mobility, the alert module 230 may also use camera images to track a movement of the passenger in determining the mobility and/or use the presence of assistance related devices (e.g., wheelchair). Moreover, the alert module 230 may further consider passengers of a young age as requiring further time, and thus may extend the defined time. In general, the alert module 230 adjusts the defined time in relation to the characteristics of the passengers to provide notice to the passenger sooner (e.g., 7.0 seconds prior to a target passing as opposed to 5.0 seconds). In yet further instances, the alert module 230 may also adjust the alert threshold to provide a greater amount of room next to the vehicle 100 for passengers that are younger or that require greater room for loading because of mobility (e.g., wheelchair ramp).

In any case, the alert module 230, in one approach, determines whether a target satisfies the alert threshold by comparing a position (e.g., a future position as estimated according to a current position and velocity) of the target with the alert threshold. In one approach, the alert module 230 compares the position by projecting a line that is parallel to the sides of the vehicle 100 at the clearance distance defined by the alert threshold. Thus, the alert threshold generally defines a safe zone or box around the vehicle 100. Accordingly, if the position of the target object is within the safe zone or projected to be within the safe zone within a defined time horizon (e.g., 5 s), then the alert module 230 determines that the target object satisfies the alert threshold and activates the alert. Accordingly, the alert module 230 may use the trajectories of the detected targets/objects, as previously mentioned. The alert module 230 may project a straight-line path according to a current speed and velocity or generate a trajectory over multiple observations of the target to provide a more precise approximation. In either case, the alert module 230 is generally defining a region about the vehicle 100 using the alert threshold and assessing whether respective targets will violate the region thereby indicating whether respective targets represent hazards to an exiting passenger.

Thus, the alert module 230, in various approaches, generates the alert itself in different forms. In one embodiment, the alert module 230 generates the alert as an audible indicator (i.e., a sound). In further approaches, the alert module 230 generates the alert as a visual indicator (e.g., a warning light positioned near or on doors of the vehicle 100). In yet further approaches, the alert module 230 may generate haptic feedback, lock a door, or perform other functions to provide the alert. Moreover, the alert module 230 can combine one or more different forms of the alert together, and/or generate the alert, for example, only upon sensing that a passenger is about to exit the vehicle 100 (e.g., from seat belt sensors, door sensors, etc.).

Additionally, the alert module 230 may adapt a form of the alert itself. For example, in general, the constraints 260 also indicate a defined time for which the alert remains active (e.g., a time that a light is on or a sound is played). In one approach, the defined time is five seconds. However, it should be appreciated that the precise timing may vary according to the implementation but is generally configured to provide a sufficient warning to the passenger to avoid the passenger exiting into a dangerous situation. Further, the alert module 230 may adapt an intensity (e.g., brightness, sound level, etc.) as a hazard nears. Moreover, as previously mentioned, the alert module 230 may generate the alerts as separate discrete occurrences, and may also extend alerts to merge multiple alerts together for successive targets. When multiple targets approach the vehicle 100 in succession and satisfy the alert threshold, there may be an intervening time between the alerts for which the alert module 230 does not generate an alert. When this intervening time is short (e.g., 2 seconds), the passenger may think the hazard has passed and quickly exit the vehicle 100 only to encounter the subsequent target bearing down on the vehicle 100. Thus, abruptly ending an alert when a subsequent alert is to be issued has the potential to cause a dangerous circumstance.

As such, in one approach, the alert module 230 extends the defined time of an initial alert to cause the initial alert to be continuously active for the defined time of the initial alert, the intervening time, and the defined time for a subsequent alert. Extending the alert to merge multiple alerts together provides for improving the safety of the passenger when exiting the vehicle 100 by avoiding intervening moments with no alert. Thus, the alert module 230, upon activating an alert, in one embodiment, monitors for an additional target satisfying the alert threshold. If the alert module 230 determines that a subsequent target satisfies the alert threshold, then instead of abating the initial alert, the alert module 230 continues to activate the initial alert beyond the defined time such that the initial alert spans an intervening time between the initial alert and a time when a subsequent alert is scheduled to be delivered.

In one approach, the alert module 230 determines whether to extend the initial alert according to a timing threshold. The timing threshold corresponds with a cool-down period after the initial alert is to end. Thus, when the intervening time is, for example, less than the timing threshold, the alert module 230 extends the initial alert. The timing threshold is generally an amount of time between alerts that is considered adequate for a passenger to exit the vehicle without concern for another hazard being immediately present. Accordingly, the subsequent target satisfies the timing threshold when the intervening time does not extend to the cool-down period. In this way, the warning system 170 improves the safety of passengers by furthering the situational awareness of the passengers. As an additional note, it should be appreciated that the alert module 230, in at least one embodiment, may not immediately deliver an alert but, in general, schedules alerts for targets that are hazards to be issued beginning, for example, the defined time out from when the target is to pass a rear or front point (e.g., rear bumper, front bumper) of the vehicle 100. Thus, the alert module 230 may identify a trajectory for a target that is to pass within the alert threshold, but does not, in at least one embodiment, immediately generate the alert, but instead schedules the alert to be delivered for the defined time prior to passing proximate to the vehicle 100.

Figure 3:
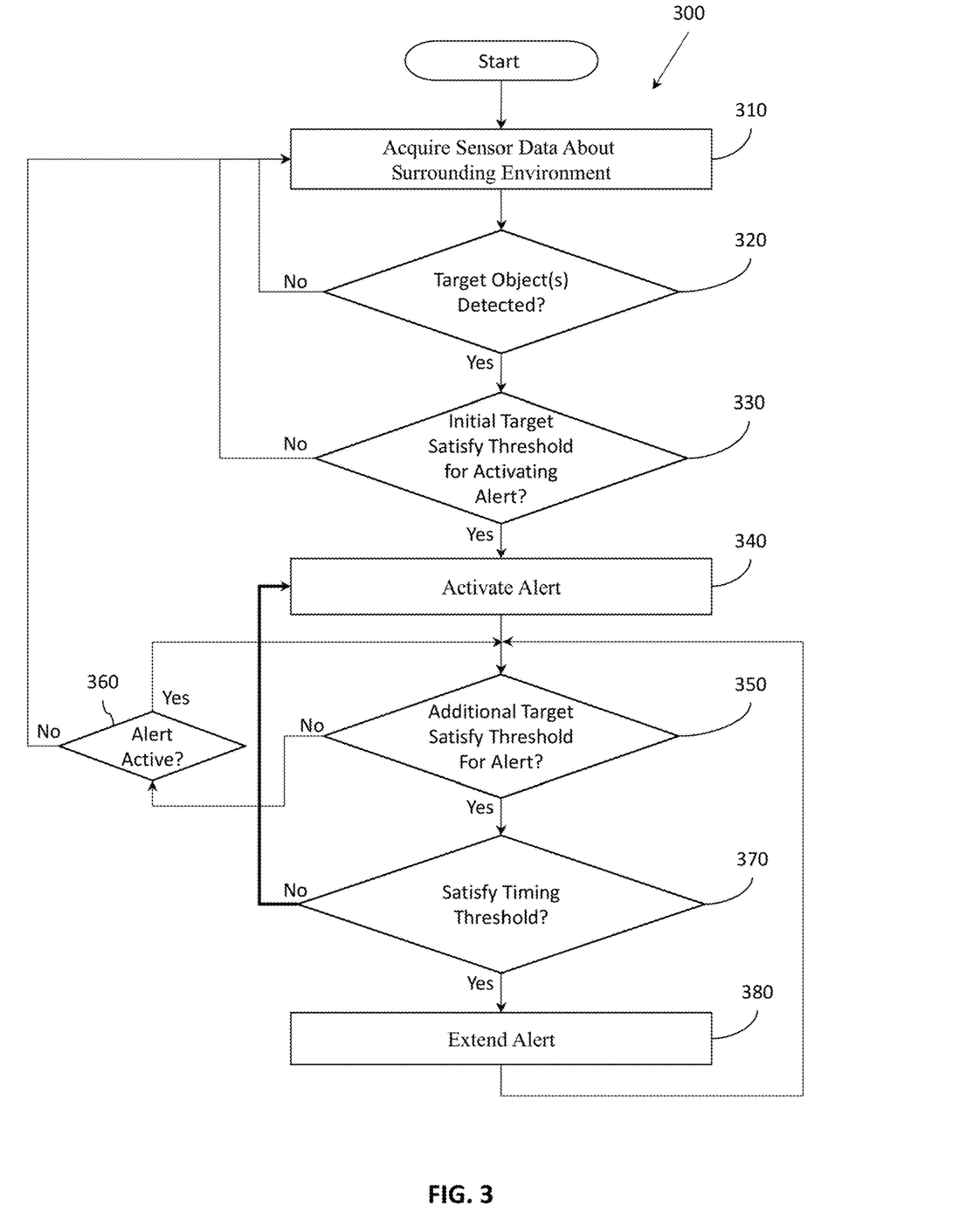
FIG. 3 illustrates one embodiment of a method associated with extending an alert for multiple successive targets.

Additional aspects of providing warnings to passengers about exiting a vehicle will be discussed in relation to FIG. 3. FIG. 3 illustrates a method 300 associated with extending an alert for multiple successive targets. Method 300 will be discussed from the perspective of the warning system 170 of FIG. 1. While method 300 is discussed in combination with the warning system 170, it should be appreciated that the method 300 is not limited to being implemented within the warning system 170 but is instead one example of a system that may implement the method 300.

At 310, the detection module 220 acquires sensor data 250 about the surrounding environment from which the detection module 220 may subsequently identify surrounding objects of the subject vehicle 100. As previously noted, the detection module 220, in one or more implementations, iteratively acquires the sensor data 250 from one or more sensors of the sensor system 120. The sensor data 250 includes observations of a surrounding environment of the subject vehicle 100 that facilitate improving the situational awareness of the vehicle 100 and associated systems about the surroundings so that such information can then be leveraged for further tasks including, for example, semi-autonomous operation, autonomous operation, generating safety alerts, and so on.

At 320, the detection module 220 analyzes the sensor data 250 using one or more detection/identification routines that generally function to detect the presence of objects, classify/identify a type of the objects (e.g., vehicle, pedestrian, etc.), and localize the objects relative to the subject vehicle 100. Moreover, the detection module 220 may further derive additional information beyond the position/velocity of the surrounding objects, such as trajectory information and other attributes that facilitate characterizing the objects and associated movements. In one or more implementations, the detection module 220 implements machine learning algorithms such as convolutional neural networks to identify/detect objects from the sensor data 250. Moreover, the detection module 220 may implement further routines to perform the localization, such as localization and mapping routines. In any case, the detection module 220 uses the sensor data 250 to acquire awareness about the surrounding environment including aspects relating to the surrounding objects so that additional determinations can be derived therefrom.

In general, the detection module 220 may detect one or more objects at 320, which are, for example, each separately monitored through an iterative process, as shown at blocks 310-330, to determine whether the objects represent hazards to a passenger. Thus, the warning system 170 generally executes the functions identified at blocks 310-330 for the respective objects while further considering whether to extend an alert once active as further discussed along with blocks 350-380. In any case, each object undergoes similar scrutiny while additional considerations are undertaken when an alert is active.

At 330, the alert module 230 determines whether the initial target satisfies an alert threshold. As previously described, the alert threshold is, in one embodiment, a defined minimum distance that defines a perimeter about the vehicle 100. This perimeter, also referred to as a safety zone around the vehicle 100, defines a region within which a passenger generally exits into from the vehicle 100. Thus, if the alert module 230 determines that the object is likely to breach this region at a time when a passenger is exiting the vehicle 100, then the target object satisfies the alert threshold, and is considered to be a hazard to the passenger. Moreover, the alert module 230 generally predicts the position of the initial target out to a time horizon that extends beyond when an alert would be delivered. That is, the alert module 230 may predict the path of the target out to ten seconds or more, which is generally an extent of time that exceeds the defined time for which the alert would be active in order to provide sufficient time to deliver the alert for, for example, passengers with different characteristics.

At 340, the alert module 230 activates an initial alert for a defined time to inform the passenger of a hazard associated with a target and the passenger exiting the subject vehicle into a path of the target. In general, activating the alert, at block 340, occurs when another alert is not already active. That is, if the alert module 230 is not presently generating an alert, then the alert module 230 newly generates an alert at 340. However, if an alert is already being delivered, then the alert module 230 considers how to provide a subsequent alert according to blocks 350-380. As previously described, the alert itself may take many different forms but is generally provided to improve awareness of the passenger about potential threats when exiting the vehicle 100. Additionally, the alert module 230 may dynamically set the defined time for the alert (i.e., an active time prior to the target encountering the vehicle 100) according to various characteristics of the passenger, as previously specified. Accordingly, by way of example, the alert module 230 may adapt the defined time to activate the alert for a longer period when the passenger is slow due to various potential mobility issues.

At 350, the alert module 230 determines whether a subsequent target satisfies the alert threshold. In one embodiment, the alert module 230 performs the same assessment as at block 330 but in relation to a second trajectory of a second target that is subsequent to a first and is tracked when the alert is active. Thus, the alert module 230 generally determines whether the second trajectory is within the defined distance from the subject vehicle 100. If the subsequent target satisfies the alert threshold, then the alert module 230 proceeds with further analysis at 370. Otherwise, the alert module 230 proceeds to determine whether the alert is still active at block 360.

At 360, the alert module 230 checks whether the alert is still active. In one embodiment, the alert module 230 continues to consider extending the active alert until reaching a point at which the alert ends or is otherwise abated. Thus, the alert module 230 continues to consider whether further targets satisfies the alert threshold at 350 until there is no alert active.

At 370, the alert module 230 determines whether the timing threshold for delivering a subsequent alert is satisfied by the subsequent target. In one embodiment, the timing threshold corresponds with a cool-down period that is generally a defined amount of time between alerts that is considered to be sufficient in order to avoid hazardous circumstances involving a passenger exiting the vehicle when another target is approaching after a first alert. Thus, the cool-down period may be defined as two seconds or another time that is defined in relation to the defined time for maintaining an alert. If the timing threshold is satisfied, then the alert module 230 proceeds to extend the active alert at block 380. Otherwise, the alert module 230 proceeds to schedule and deliver the alert for the subsequent target, as discussed at block 340, which is generally after the cool-down period has expired.

At 380, the alert module 230 extends the defined time of the initial alert to merge the initial alert into a subsequent alert without interruption. In one embodiment, the alert module 230 extends the initial alert in order to continuously activate an alert over the defined time, an intervening time, and a subsequent defined time for the subsequent alert. In this way, there are no brief interruptions between delivering separate alerts, and the warning system 170 can improve safety of the passenger from exiting the subject vehicle into a path of the subsequent target.

Figure 4:
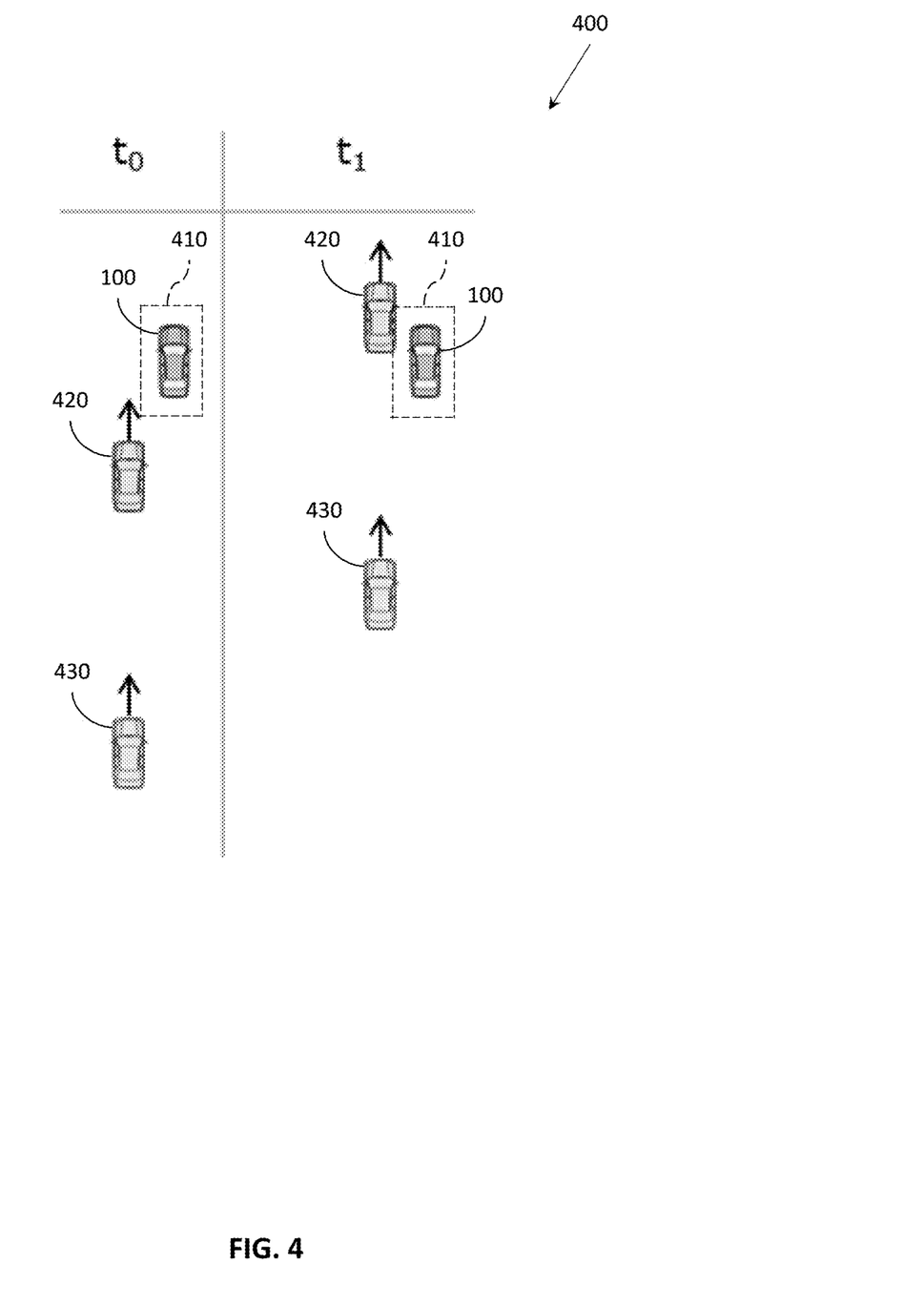
FIG. 4 illustrates an example of multiple targets passing proximate to a subject vehicle.
Figure 5:
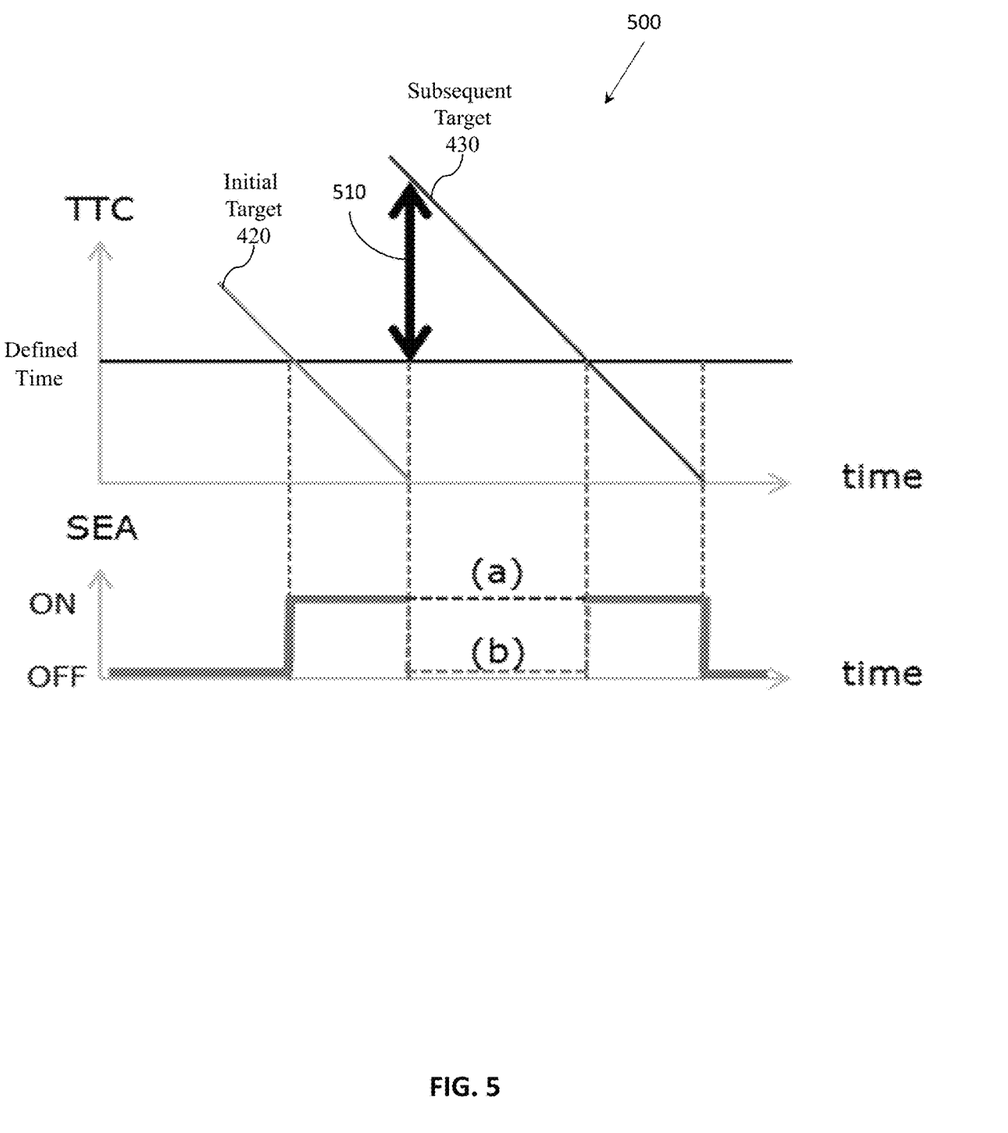
FIG. 5 illustrates a graph of timing activation for a safe exit alert.

As a further explanation of how the presently disclosed systems and methods communicate alerts to passengers about exiting the vehicle 100, consider FIGS. 4-5. FIG. 4 illustrates an example environment 400 of the vehicle 100 at two separate times to and ti. As illustrated, the alert threshold 410 defines a perimeter about the vehicle 100. Additionally, approaching vehicles (i.e., targets) are illustrated as approaching the vehicle 100 from along the rear of the vehicle 100.

During this time (as shown at ti), the warning system 170 further determines that the subsequent vehicle 430 also satisfies the alert threshold and the timing threshold for extending the initial alert. Thus, if the warning system 170 did not extend the initial alert, the system 170 would generate two distinct alerts separated by an intervening period without an alert. Yet, because the system 170 identifies the difficulty of this intervening period, the system 170 is able to merge the alerts into a continuous alert that spans the initial defined time for the initial alert, the intervening time, and a subsequent defined time for the subsequent alert.

It should be noted that while the example vehicles 420 and 430 are shown traveling in the same direction as the vehicle 100, in further aspects, the objects that may present a risk to the passenger are tracked from all directions in relation to the vehicle 100. That is, the objects may approach from behind, ahead, to the side, and so on. In all cases, the warning system 170 undertakes the analysis set forth above in relation to the alert threshold and the timing threshold in order to improve the safety of the passenger. Moreover, the objects need not be traveling in the same direction relative to the vehicle 100 nor be traveling on the same side of the vehicle 100. Thus, the warning system 170 undertakes a robust analysis of objects approaching the vehicle 100 from all directions and in different configurations to improve the safety of exiting passengers.

As a further explanation of the scene 400 depicted by FIG. 4, consider FIG. 5, which illustrates a graph 500 of various thresholds and timing considerations. The graph 500 is comprised of two elements, the "TTC" (time-to-collision), and "SEA" (Safe Exit Alert). The TTC element indicates a timing associated with activating an alert for targets that satisfy the alert threshold. That is, the TTC, as shown generally indicates a time until the target would pass into the defined zone around the vehicle 100. As shown, the initial target 420 satisfies the alert threshold for which a safe exit alert is issued. Yet, the subsequent target 430 is also identified at a point in time 510 prior to the initial alert expiring and as having a trajectory that will violate the minimum distance. Moreover, the timing between the alerts would further satisfy the timing threshold 510. Thus, the warning system 170 maintains the alert in an active state (a) instead of deactivating the alert for the intervening interval (b).

Additionally, it should be appreciated that the warning system 170 from FIG. 1 can be configured in various arrangements with separate integrated circuits and/or electronic chips. In such embodiments, the detection module 220 is embodied as a separate integrated circuit. Additionally, the alert module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies (e.g., method 300 of FIG. 3) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the warning system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data 116 can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras 126 can be high dynamic range (HDR) cameras or infrared (IR) cameras.

The vehicle 100 can include an input system 130. An "input system" includes, without limitation, devices, components, systems, elements, or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system, or a geolocation system.

The processor(s) 110, the warning system 170, and/or the autonomous driving system 160 can be operatively connected to communicate with the various vehicle systems 150 and/or individual components thereof. For example, returning to FIG. 1, the processor(s) 110 and/or the autonomous driving system 160 can be in communication to send and/or receive information from the various vehicle systems 150 to control the movement, speed, maneuvering, heading, direction, etc. of the vehicle 100. The processor(s) 110, the warning system 170, and/or the autonomous driving system 160 may control some or all of these vehicle systems 150 and, thus, may be partially or fully autonomous.

The processor(s) 110, the warning system 170, and/or the autonomous driving system 160 can be operatively connected to communicate with the various vehicle systems 150 and/or individual components thereof. For example, returning to FIG. 1, the processor(s) 110, the warning system 170, and/or the autonomous driving system 160 can be in communication to send and/or receive information from the various vehicle systems 150 to control the movement, speed, maneuvering, heading, direction, etc. of the vehicle 100. The processor(s) 110, the warning system 170, and/or the autonomous driving system 160 may control some or all of these vehicle systems 150.

The processor(s) 110, the warning system 170, and/or the autonomous driving system 160 may be operable to control the navigation and/or maneuvering of the vehicle 100 by controlling one or more of the vehicle systems 150 and/or components thereof. For instance, when operating in an autonomous mode, the processor(s) 110, the warning system 170, and/or the autonomous driving system 160 can control the direction and/or speed of the vehicle 100. The processor(s) 110, the warning system 170, and/or the autonomous driving system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the warning system 170 and/or the autonomous driving system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the autonomous driving system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, one or more data stores 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the warning system 170 can be configured to determine travel path(s), current autonomous driving maneuvers for the vehicle 100, future autonomous driving maneuvers and/or modifications to current autonomous driving maneuvers based on data acquired by the sensor system 120. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that may contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A warning system for alerting a passenger about hazards when exiting a subject vehicle, comprising:
   one or more processors;
   a memory communicably coupled to the one or more processors and storing:
   a detection module including instructions that when executed by the one or more processors cause the one or more processors to identify an initial target and a subsequent target according to sensor data about a surrounding environment of the subject vehicle, wherein the initial target and the subsequent target are separate from the subject vehicle; and
   an alert module including instructions that when executed by the one or more processors cause the one or more processors to, in response to determining that the initial target satisfies an alert threshold, activate an initial alert inside of the subject vehicle for a defined time that informs the passenger within the subject vehicle about a hazard associated with the initial target and the passenger exiting the subject vehicle into a path of the initial target, and
   extend the defined time for providing the alert to the passenger of the subject vehicle responsive to the subsequent target satisfying the alert threshold and a timing threshold that defines a cool-down period between activating separate alerts.

2. The warning system of claim 1, wherein the initial target and the subsequent target are moving objects in the surrounding environment of the subject vehicle including one or more of: a nearby vehicle, a pedestrian, and a bicycle, and
   wherein the alert module includes instructions to extend the defined time to cause the initial alert to be continuously active for the defined time of the initial alert, an intervening time, and the defined time for a subsequent alert in order to improve safety of the passenger from exiting the subject vehicle into the path of the subsequent target.

3. The warning system of claim 1, wherein the detection module includes instructions to identify the initial target and the subsequent target according to the sensor data include instructions to detect the initial target and the subsequent target from the sensor data and determine a first trajectory for the initial target and a second trajectory for the subsequent target in relation to the subject vehicle.

4. The warning system of claim 3, wherein the alert module includes instructions to determine that the initial target satisfies the alert threshold by determining whether the first trajectory is within a defined minimum distance of the subject vehicle, wherein the alert module includes instructions to determine that the subsequent target satisfies the alert threshold by determining whether the second trajectory is within the defined minimum distance of the subject vehicle, and
wherein the defined minimum distance is a safe passing distance relative to the subject vehicle for the passenger to exit without colliding with a passing target.

5. The warning system of claim 1, wherein the alert module includes instructions to activate the initial alert for the defined time including instructions to generate the alert as at least one of: an audible sound, a visual indicator, haptic feedback, and locking a door of the subject vehicle.

6. The warning system of claim 1, wherein the alert module includes instructions to extend the defined time including instructions to continue to activate the initial alert beyond the defined time to span an intervening time between the initial alert and a subsequent alert for the subsequent target.

7. The warning system of claim 6, wherein the timing threshold corresponds with the cool-down period, and wherein the subsequent target satisfies the timing threshold when the intervening time does not extend to the cool-down period.

8. The warning system of claim 1, wherein the alert module includes instructions to activate the initial alert including instructions to activate the initial alert for the defined time that is based, at least in part, on characteristics of the passenger including one or more of a mobility of the passenger, and an age of the passenger, and
wherein the subject vehicle operates at least semi-autonomously.

9. A non-transitory computer-readable medium storing instructions for alerting a passenger about hazards when exiting a subject vehicle and that when executed by one or more processors, cause the one or more processors to:
identify an initial target and a subsequent target according to sensor data about a surrounding environment of the subject vehicle;
in response to determining that the initial target satisfies an alert threshold, activate an initial alert for a defined time to inform the passenger of a hazard associated with the initial target and the passenger exiting the subject vehicle into a path of the initial target; and
extend the defined time responsive to the subsequent target satisfying the alert threshold and a timing threshold that defines a cool-down period between activating separate alerts.

10. The non-transitory computer-readable medium of claim 9, wherein the initial target and the subsequent target are moving objects in the surrounding environment of the subject vehicle including one or more of: a nearby vehicle, a pedestrian, and a bicycle, and
wherein the instructions to extend the defined time cause the initial alert to be continuously active for the defined time of the initial alert, an intervening time, and the defined time for a subsequent alert in order to improve safety of the passenger from exiting the subject vehicle into the path of the subsequent target.

11. The non-transitory computer-readable medium of claim 9, wherein the instructions to identify the initial target and the subsequent target according to the sensor data include instructions to detect the initial target and the subsequent target from the sensor data and determine a first trajectory for the initial target and a second trajectory for the subsequent target in relation to the subject vehicle.

12. The non-transitory computer-readable medium of claim 11, wherein the instructions to determine whether the initial target satisfies the alert threshold include instructions to determine whether the first trajectory is within a defined minimum distance of the subject vehicle, wherein the to determine whether the subsequent target satisfies the alert threshold including instructions to determine whether the second trajectory is within the defined minimum distance of the subject vehicle, and
wherein the defined minimum distance is a safe passing distance relative to the subject vehicle for the passenger to exit without colliding with a passing target.

13. The non-transitory computer-readable medium of claim 9, wherein the instructions to activate the initial alert for the defined time including instructions to generate the alert as at least one of: an audible sound, a visual indicator, haptic feedback, and locking a door of the subject vehicle, and
wherein the instructions to extend the defined time include instructions to continue to activate the initial alert beyond the defined time to span an intervening time between the initial alert and a subsequent alert for the subsequent target.

14. A method of alerting a passenger about hazards when exiting a subject vehicle, comprising:
identifying an initial target and a subsequent target according to sensor data about a surrounding environment of the subject vehicle;
in response to determining that the initial target satisfies an alert threshold, activating an initial alert for a defined time to inform the passenger of a hazard associated with the initial target and the passenger exiting the subject vehicle into a path of the initial target; and
extending the defined time responsive to the subsequent target satisfying the alert threshold and a timing threshold that defines a cool-down period between activating separate alerts.

15. The method of claim 14, wherein the initial target and the subsequent target are moving objects in the surrounding environment of the subject vehicle including one or more of: a nearby vehicle, a pedestrian, and a bicycle, and
wherein extending the defined time causes the initial alert to be continuously activated for the defined time of the initial alert, an intervening time, and the defined time for a subsequent alert improving safety of the passenger from exiting the subject vehicle into a path of the subsequent target.

16. The method of claim 14, wherein identifying the initial target and the subsequent target according to the sensor data includes detecting the initial target and the subsequent target from the sensor data and determining a first trajectory for the initial target and a second trajectory for the subsequent target in relation to the subject vehicle.

17. The method of claim 16, wherein determining that the initial target satisfies the alert threshold includes determining that the first trajectory is within a defined minimum distance of the subject vehicle, wherein determining that the subsequent target satisfies the alert threshold includes determining that the second trajectory is within the defined minimum distance of the subject vehicle, and
- wherein the defined minimum distance is a safe passing distance relative to the subject vehicle for the passenger to exit without colliding with a passing target.

18. The method of claim 14, wherein activating the initial alert for the defined time includes generating the alert as at least one of: an audible sound, a visual indicator, haptic feedback, and locking a door of the subject vehicle,
- wherein activating the initial alert includes activating the initial alert for the defined time that is based, at least in part, on characteristics of the passenger including one or more of a mobility of the passenger, and an age of the passenger.

19. The method of claim 14, wherein extending the defined time includes continuing to activate the initial alert beyond the defined time to span an intervening time between the initial alert and a subsequent alert for the subsequent target.

20. The method of claim 14, wherein the timing threshold corresponds with the cool-down period, and wherein the subsequent target satisfies the timing threshold when an intervening time does not extend to the cool-down period.

* * * * *

UNITED STATES PATENT AND TRADEMARK OFFICE
CERTIFICATE OF CORRECTION

PATENT NO. : 11,085,213 B2  
APPLICATION NO. : 16/715703  
DATED : August 10, 2021  
INVENTOR(S) : Joshua Goriesky, Nathaniel Sherrit and Ryo Takaki Page 1 of 1

It is certified that error appears in the above-identified patent and that said Letters Patent is hereby corrected as shown below:

On the Title Page

In the Abstract, Line 1, delete "System, methods," and insert --Systems, methods, and--

In the Specification

In Column 1, Line 49, delete "provides abruptly ends an" and insert --abruptly ends an--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*